United States Patent
Lee

(10) Patent No.: US 10,949,559 B1
(45) Date of Patent: Mar. 16, 2021

(54) REPOSITORY-BASED PRIVILEGE ESCALATION FOR WORKFLOWS

(71) Applicant: INTUIT INC., Mountain View, CA (US)

(72) Inventor: Edward K. Lee, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 232 days.

(21) Appl. No.: 16/002,248

(22) Filed: Jun. 7, 2018

Related U.S. Application Data

(60) Provisional application No. 62/524,410, filed on Jun. 23, 2017.

(51) Int. Cl.
  *G06F 21/00* (2013.01)
  *G06F 21/62* (2013.01)

(52) U.S. Cl.
  CPC ........ *G06F 21/6218* (2013.01); *G06F 21/629* (2013.01)

(58) Field of Classification Search
  None
  See application file for complete search history.

(56) References Cited

U.S. PATENT DOCUMENTS

| | | | | |
|---|---|---|---|---|
| 9,830,469 B1* | 11/2017 | Anderson | ........... | G06F 21/6218 |
| 9,928,365 B1* | 3/2018 | Anderson | ............. | G06F 21/552 |
| 2006/0248083 A1* | 11/2006 | Sack | .................. | G06F 21/6218 |
| 2006/0248599 A1* | 11/2006 | Sack | .................. | G06F 21/6227 726/27 |
| 2009/0249448 A1* | 10/2009 | Choi | .................. | H04L 63/0815 726/4 |
| 2009/0271863 A1* | 10/2009 | Govindavajhala | .......................... | H04L 63/1433 726/23 |
| 2009/0282457 A1* | 11/2009 | Govindavajhala | .... | G06F 21/577 726/1 |
| 2009/0319527 A1* | 12/2009 | King | ...................... | G06Q 30/06 |
| 2011/0030036 A1* | 2/2011 | Wells, Jr. | ................ | G06F 9/468 726/4 |
| 2011/0083163 A1* | 4/2011 | Auvenshine | ............ | G06F 21/57 726/4 |
| 2015/0149611 A1* | 5/2015 | Lissack | ................... | H04L 41/12 709/224 |

(Continued)

OTHER PUBLICATIONS https://en.wikipedia.org/wiki/setuid—acccessed Jun. 22, 2017.

*Primary Examiner* — Maung T Lwin
(74) *Attorney, Agent, or Firm* — Patterson + Sheridan, LLP

(57) ABSTRACT

Certain aspects of the present disclosure provide techniques for improved control of workflow execution. Embodiments include receiving, by an execution engine, a request from a user to execute a workflow that is stored in a repository. The workflow may be an operation that is associated with an operation privilege level, and a user privilege level of the user may be a lower privilege level than the operation privilege level. Embodiments include determining a repository privilege level associated with the repository by accessing repository privilege data in a file stored on the repository. Embodiments include escalating the user privilege level to the repository privilege level. Embodiments include executing the workflow, based on the request from the user, at the repository privilege level. Embodiments include restoring the user privilege level to the lower privilege level.

21 Claims, 5 Drawing Sheets

(56) References Cited

U.S. PATENT DOCUMENTS

| | | | |
|---|---|---|---|
| 2016/0028757 A1* | 1/2016 | Kruglick | H04L 63/1416 |
| | | | 726/23 |
| 2016/0078225 A1* | 3/2016 | Ray | G06F 21/56 |
| | | | 726/23 |
| 2017/0026454 A1* | 1/2017 | Lindberg | G06F 21/51 |
| 2017/0091182 A1* | 3/2017 | Wurster | G06F 16/182 |

* cited by examiner

US 10,949,559 B1

REPOSITORY-BASED PRIVILEGE ESCALATION FOR WORKFLOWS

CROSS-REFERENCE TO RELATED APPLICATION

This application claims the benefit of U.S. Provisional Application No. 62/524,410, filed Jun. 23, 2017, which is hereby incorporated by reference in its entirety.

INTRODUCTION

Aspects of the present disclosure relate to improved control of workload execution. In particular, embodiments described herein involve associating privilege levels with repositories in order to control execution of workloads stored in the repositories.

BACKGROUND

Using a computing system may involve the use of workflows, wherein a workflow is a sequence of steps and/or operations to be performed by the computing system. Applications may involve the execution of workflows by users with different privilege levels. For example, an application may have normal users and administrative users with access to different workflows. That is, certain workflows or operations within workflows may be limited to entities with certain privilege levels, such as administrative users.

In some applications, there may be operations or workflows that are generally restricted to users of a certain privilege level, but which are applicable to users of a different privilege level under certain circumstances. For example, access to a particular computer system may generally be limited to administrative users, but an administrative user may wish to allow non-administrative users to access the system for certain purposes, such as to run virus scans on the particular computer system. As such, there is a need in the art for improved methods of controlling workflow execution.

BRIEF SUMMARY

Certain embodiments provide a method for improved control of workflow execution. The method generally includes receiving, by an execution engine, a request from a user to execute a workflow that is stored in a repository, wherein the workflow comprises an operation that is associated with an operation privilege level, and wherein a user privilege level of the user is a lower privilege level than the operation privilege level; determining a repository privilege level associated with the repository by accessing repository privilege data in a file stored on the repository; escalating the user privilege level to the repository privilege level; executing the workflow, based on the request from the user, at the repository privilege level; and restoring the user privilege level to the lower privilege level.

Other embodiments include a non-transitory computer-readable medium comprising instructions that, when executed by one or more processors, cause the one or more processors to perform a method for improved control of workflow execution. The method generally includes receiving, by an execution engine, a request from a user to execute a workflow that is stored in a repository, wherein the workflow comprises an operation that is associated with an operation privilege level, and wherein a user privilege level of the user is a lower privilege level than the operation privilege level; determining a repository privilege level associated with the repository by accessing repository privilege data in a file stored on the repository; escalating the user privilege level to the repository privilege level; executing the workflow, based on the request from the user, at the repository privilege level; and restoring the user privilege level to the lower privilege level.

Other embodiments include a system comprising one or more processors and a non-transitory computer-readable medium comprising instructions that, when executed by the one or more processors, cause the one or more processors to perform a method for improved control of workflow execution. The method generally includes receiving, by an execution engine, a request from a user to execute a workflow that is stored in a repository, wherein the workflow comprises an operation that is associated with an operation privilege level, and wherein a user privilege level of the user is a lower privilege level than the operation privilege level; determining a repository privilege level associated with the repository by accessing repository privilege data in a file stored on the repository; escalating the user privilege level to the repository privilege level; executing the workflow, based on the request from the user, at the repository privilege level; and restoring the user privilege level to the lower privilege level.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
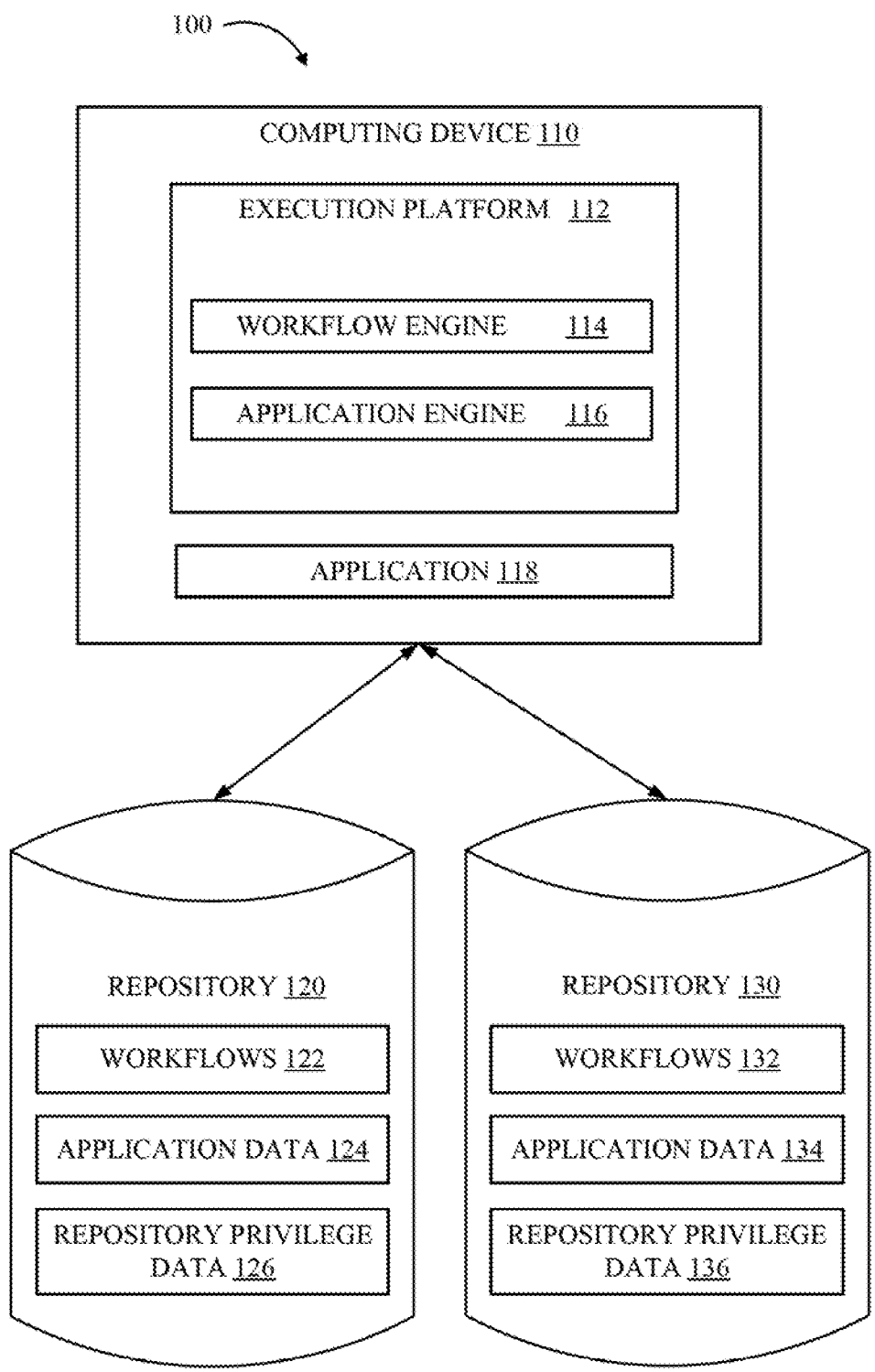
FIG. 1 depicts an example computing environment in which systems of the present disclosure may operate.

Aspects of the present disclosure provide apparatuses, methods, processing systems, and computer readable mediums for improving control of workflow execution. A workflow generally refers to a sequence of steps or operations to be performed by a computer system. Embodiments described herein relate to associating privilege data with repositories in order to control execution of workloads stored within the repositories.

The modern use of containers has made efficient certain types of applications. A "container" and/or "container instance" is referred to herein as a program that runs in an isolated environment from other programs, and may be used as a step in a workflow. For example, the user of containers is useful for running large complicated batch jobs such as builds and tests using a queue of complex jobs wherein when one phase of a job finishes, it spins up many substeps that in turn spin up other subsubsteps, and so forth. As another example, containers are also useful for deploying microservices, which are scalable distributed applications comprising multiple tiers of components. For example a simple three-tier web application may include three tiers of components: a front-end code, a business logic, and a back-end database.

With distributed systems, software runs on multiple servers in different container/virtual machine/physical machine locations. A "distributed system" as referred to herein includes any system that has an application and/or microservice running on two or more containers, nodes, virtual machines, and/or physical machines. A distributed system comprises components that may independently fail and recover and where the components, such as servers and components, communicate with each other over communication channels that may not be completely reliable. Each server is not 100% reliable, and thus the servers must tolerate failures and/or recover from partial failures. Using declarative workflow definitions (e.g., specifications of particular operations to be performed in a workflow) gives an inherent flexibility in how to accomplish a given step, and generally forces a designer to describe the step in a repeatable way. This allows for efficient automated re-execution of steps when a node in the distributed system temporarily or permanently fails.

Access control is an integral part of the deployment of a workflow. For example, a workflow may include privileged operations (e.g., operations associated with operation privilege levels), the access to which is restricted to authorized user(s) who participate in that operation. A privileged operation may include, for example, modifying certain files may be restricted to certain users, such as administrative users. As another example, accessing information stored in a particular user's profile may be restricted to the particular user and/or administrative users.

Privileges may be implemented in a variety of ways, such as through privilege levels associated with users and operations, through lists of permitted operations associated with users, and/or through lists of authorized users associated with operations, as just a few examples.

Enforcing privileges based on which user is attempting to execute an operation is often an effective way to control workflow execution, but such techniques have limitations. For example, in some applications, there may be operations that are generally restricted to certain users (e.g., through operation privilege levels) but are applicable to other users under particular circumstances. Access to a system may be generally restricted to administrative users, for example, but an administrative user may wish to allow non-administrative users to access the system for particular purposes, such as to run virus scans on the otherwise restricted system. As such, embodiments of the present disclosure involve associating privilege data with repositories in order to control access to particular workflows stored in the repositories. For example, a repository may have a repository privilege level that applies to execution of all workflows stored in the repository regardless of which user is executing a workflow. If a user with a lower privilege level, such as a general privilege level (e.g., if the user privilege level is "general" rather than "administrative" or "admin"), executes a workflow stored in a repository with a higher privilege level, such as an administrative privilege level (e.g., if the repository privilege level is "administrative" or "admin"), the user's privilege level is escalated to the higher privilege level for the execution of the workflow. Adding and modifying workflows stored on a repository with a particular privilege level may be limited to users that also have the particular privilege level, while execution of the workflows may be allowed for all users.

In some cases, a privilege level associated with a repository may be referred to as a "repository privilege level," a privilege level associated with a user may be referred to as a "user privilege level" or a "user's privilege level," and a privilege level associated with an operation may be referred to as an "operation privilege level". In general, repository privilege levels, user privilege levels, and operation privilege levels may all refer to privilege levels that are selected from the same group of possible privilege levels. For example, privilege levels may include administrative, general, and the like.

For example, an administrative user (e.g., a user with a user privilege level of "administrative") may create a workflow for running a virus scan on a system for which access is generally limited to administrative users. The workflow includes one or more operations that would normally only be able to be performed by a user with administrative privileges, such as accessing a file system of the system (e.g., operations associated with accessing the file system have an operation privilege level of "administrative"). The administrative user may store the workflow in a repository that is associated with an administrative privilege level (e.g., a repository with a repository privilege level of "administrative"). As such, a user with a non-administrative privilege level (e.g., a user with a user privilege level of "general") may initiate execution of the workflow and, due to the repository privilege level of the repository in which the workload is stored, the user's privilege level is escalated to an administrative privilege level for the purposes of executing the workflow. This allows the non-administrative user to run a virus scan on a system that the user would not normally be permitted to access.

Systems described here may include an execution engine that executes, on behalf of users, workflows that are stored in one or more repositories. Users may be assigned various privileges with respect to execution of workflows and/or operations within workflows. Repositories may also be assigned privileges such that all workflows in a certain repository are executed at a particular privilege level regardless of user privileges. In one embodiment, a repository may be associated with an administrative privilege level, and may store a specially designed workflow that includes an operation that can generally only be run by administrative users. A user with a general privilege level (e.g., the user does not have administrative privileges) may run the specially designed workflow in the repository during the course of using an application. While the user does not have the requisite privileges to run the operation, the execution engine determines that the repository has administrative privileges, and escalates the user's privilege level to that of an administrative user in order to execute the operation. In some embodiments, the execution engine restores the user's privilege level to its previous state (e.g., that of a general user) after executing the operation or after executing the workflow.

Associating privileges with repositories for privilege-escalation purposes provides particular advantages as compared to potential alternative techniques, such as associating privileges directly with workflows. A workflow is a piece of computer code, and since computer code can be copied and modified, associating privileges directly with the workflow would be volatile and open to security risks. A repository, on the other hand, is a specific storage location that may be under the administrative control of users with privilege levels corresponding to that of the repository. Therefore, these users can control what workflows are stored in the repository and, therefore, can efficiently define special workflows that can be securely executed, but not modified, by users of lower privilege levels.

Techniques described herein constitute an improvement with respect to conventional industry practice because they allow for more dynamic access control for executing workflows. Associating privilege data with repositories allows for storing specialized workflows that can be executed by a user of any privilege level (e.g., through privilege escalation) while including operations that are generally (e.g., without privilege escalation) limited to users that have certain privileges. Techniques described herein allow for a user's privilege level to be temporarily escalated for the purposes of performing particular limited workflows stored in a particular repository. This is an improvement over other techniques, such as those involving only static privileges for users, as it allows for the creation of specialized workflows whereby a user can temporarily perform operations above the user's static privilege level within a particularly controlled context.

Example Computing Environment

FIG. 1 illustrates an example computing environment 100 in which systems of the present disclosure may operate. As shown, the computing environment 100 includes a computing device 110 connected to repositories 120 and 130. While computing device 110 and repositories 120 and 130 are depicted as individual components, persons of skill in the art will understand that the computing device 110 and the repositories 120 and 130 may represent processors, memory, storage, cache resources, and other hardware in a single machine or distributed across multiple machines and locations (e.g., in a cloud computing arrangement).

Computing device 110 comprises an execution platform 112 that runs workflows (e.g., workflows 122 and 132) and/or executable objects of an application (e.g., application 118) based on application metadata and other application state data (e.g., application data 124 and 134). Execution platform 112 includes a workflow engine 114 and an application engine 116.

In the example computing environment 100, the execution platform 112 distinguishes between two types of executable objects: workflows and applications. A workflow is a source object, such as a YAML (YAML Ain't Markup Language) object, that may be run by the workflow engine 114. An application is generally a non-source object that may be run by the application engine 116. Examples of non-source objects include executables compiled from source code.

Workflows may be run or triggered in many ways including manual user action, programmatically by other workflows or applications, based on time, or events.

Computing device 110 comprises an application 118. Application 118 may be an application, such as a financial services application, antivirus application, web browser, or the like that is executed by application engine 116.

Repositories 120 and 130 comprise workflows 122 and 132, application data 124 and 134, and repository privilege data 126 and 136. Workflows 122 and 132 may each include one or more workflows that define a series of operations. Application data 124 and 134 may comprise application metadata and state data used by application engine 116 to execute applications (e.g., application 118). In alternative embodiments, application 118 executes itself separately from application engine 116. Application engine 116 is included to represent the distinction made by computing device 110 between executing workflows and applications.

Repository privilege data 126 and 136 comprises data identifying privileges associated with repositories 120 and 130. In some embodiments, repository privilege data 126 or 136 may not contain any data unless one of repositories 120 and 130 has privileges. For example, repository privilege data 126 may not include any privilege data (e.g., repository privilege data 126 may not be present, which may indicate that repository 120 does not have any specific associated privileges), while repository privilege data 136 may indicate that repository 130 has administrative privileges. As such, workflows 122 would be executed by workflow engine 114 according to the privileges of a user that executes them, while workflows 132 would be executed with administrative privileges (e.g., the privilege level of a user executing workflows 132 may be escalated to an administrative privilege level for the purposes of executing workflows 132).

In certain embodiments, repository privilege data 126 and 136 may each be stored in a YAML (YAML Ain't Markup Language) file or document on repositories 120 and 130. For example, repository privilege data 126 and 136 may comprise lists or maps that specify privilege levels that are permitted to perform different operations with respect to workflows in repositories 120 and 130, such as create, read, list, update, delete, and the like. Storing repository privilege data 126 and 136 on repositories 120 and 130 allows for convenient access control for both execution and storage/modification of workflows within repositories 120 and 130. Furthermore, repository privilege data 126 and 136 may also provide access control for updating privilege levels. For example, repository privilege data 126 and/or 136 may specify that only users with administrative privileges are permitted to modify repository privilege data 126 and/or 136.

Privilege enforcement according to embodiments of the present disclosure may be implemented in a variety of ways. For example, privileges may be defined as privilege levels (e.g., general, user, super-user, administrative, and the like). In other embodiments, privileges may be defined as a list of permitted operations. For example, users, groups of users, and/or repositories may be associated with lists of permitted operations such as create, read, list, update, delete, and the like. In other embodiments, privileges may be implemented as lists of users and/or repositories that are permitted to access a particular operation or workflow. For example, a workflow may be associated with a list of users and/or repositories that are permitted to execute the workflow. In other embodiments, privileges may be enforced by restricting access to keys, passwords, and/or other credentials. For example, certain operations may require a key, and access to the key may be limited to certain privilege levels (e.g., administrative) or to certain users and/or repositories. In other embodiments, privileges may define which resources or sets of resources a particular user, group of users, and/or repository is permitted to access or modify. For example, a first user may be permitted to access one particular workflow while a second user may be permitted to access a set of workflows.

Privilege escalation may be accomplished in a number of different ways. For example, repository privilege data 126 and 136 may indicate the privilege level to be used when running any workflows in repository 126 or 136. The execution platform 112 may then interpret repository privilege data 126 or 136 by setting the effective privilege level of any workflows executed from repository 120 or 130 to the level specified by repository privilege data 126 or 136. Operations invoked from the workflow are then treated by the execution platform 112 as invoked at the (potentially higher) repository privilege level rather than the privilege level of the user who is running the workflow. In certain embodiments, a user's privileges may be escalated by using a proxy entity such as an "effective user" rather than a privilege level. For example, an effective user with privileges to execute all operations in a workflow may be temporarily substituted for the user (e.g., the effective user is associated with the repository privilege level and is treated "effectively" as if it were the user such that the workflow is executed on behalf of the effective user).

In various embodiments, privilege escalation and de-escalation occurs dynamically during the path of execution (e.g., as workflows are subsequently executed by workflow engine 114), such as when control is transferred from one workflow in a repository that does not have administrative privileges (e.g., one of workflows 122 in repository 120) to another workflow in a repository that has administrative privileges (e.g., one of workflows 132 in repository 130) and back again. For example, when a workflow stored in a repository with a particular privilege level is executed by a user, the user's privilege level is escalated to the particular privilege level, and then the user's privilege level is de-escalated (e.g., restored) to the user's normal privilege level once the workflow has been executed, and subsequent workflows may be executed at the user's original privilege level.

In certain embodiments, workflows stored in a repository with a particular privilege level can only be modified by users with the particular privilege level. For example, if repository privilege data 136 indicates that repository 130 has an administrative privilege level, then workflows 132 may only be modified by users with administrative privileges. This prevents non-administrative users from arbitrarily modifying workflows stored in repository 130 to include additional operations that could be performed by the non-administrative user at the escalated privilege level of repository 130.

It is noted that, while FIG. 1 depicts repository privilege data being stored in the repositories, other arrangements are possible. For example, repositories may be associated with privilege data in mapping data (e.g., a data structure that stores mappings between repositories and privilege data) stored by execution engine 112 or in a separate storage entity.

While not shown in FIG. 1, computing environment 100 may include additional components, such as a binary repository that stores application objects (e.g., derived from source code) and additional computing devices such as servers and client devices. For example, applications described herein may comprise client-server applications that are executed on a server and accessed by a user through a user interface of a client device.

Figure 2:
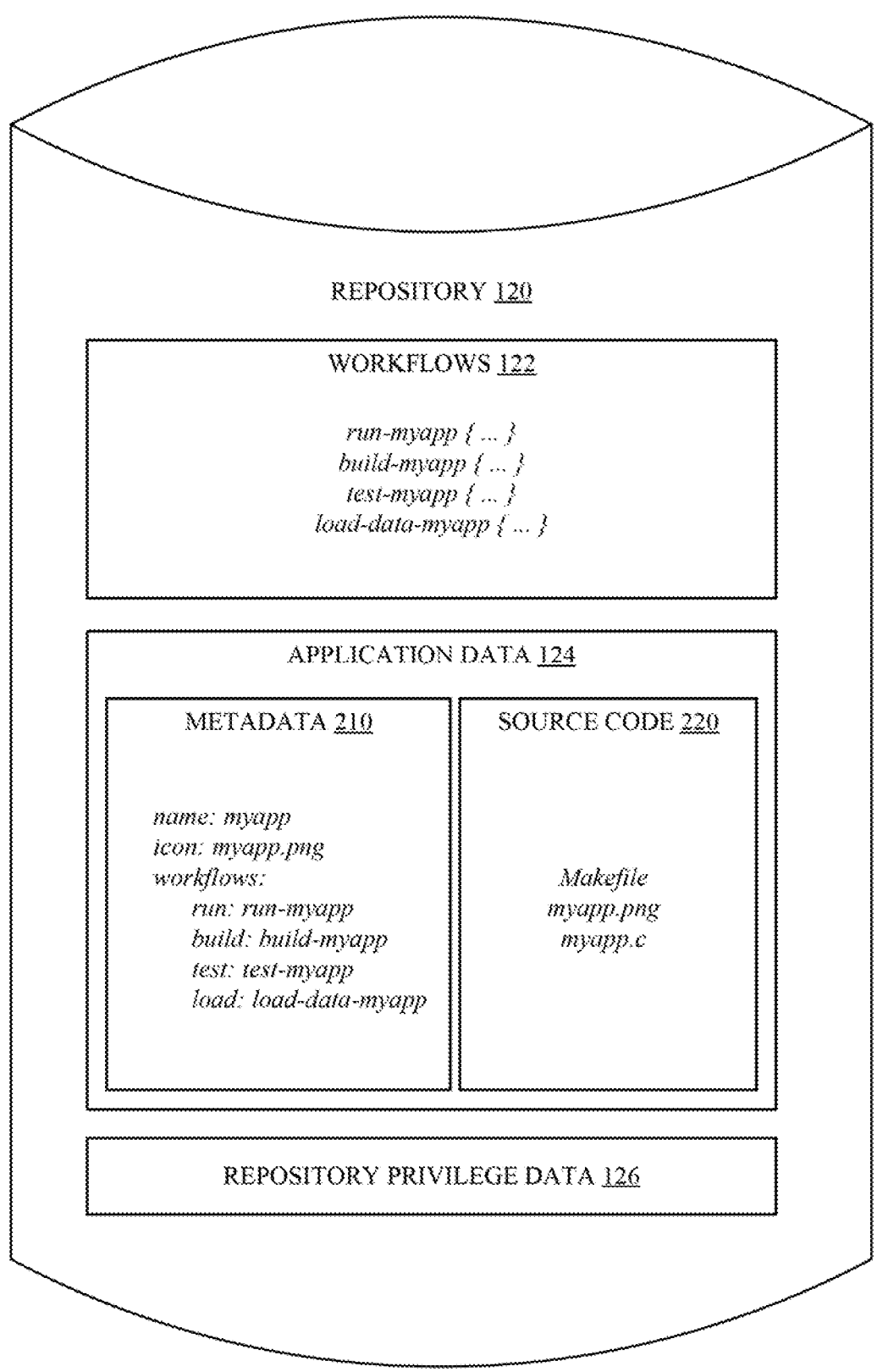
FIG. 2 depicts an example repository with which embodiments of the present disclosure may be implemented.

FIG. 2 depicts an example repository 120 with which embodiments of the present disclosure may be implemented. For example, repository 120 may be the same repository 120 that is shown and described with respect to FIG. 1.

Workflows 122 includes a plurality of workflows (e.g., entitled run-myapp, build-myapp, test-myapp, and load-data-myapp) related to an application called "myapp". Application data 124 comprises metadata 210 and source code 220 related to the application "myapp".

Metadata 210 includes information about the application "myapp". For example metadata 210 specifies that the application is named "myapp", has an icon "myapp.png", and includes several workflows that perform particular functions for the application. For example, "run-myapp" runs the application, "build-myapp" builds the application, "test-myapp" tests the application, and "load-data-myapp" loads the application. These workflows are included in workflows 122.

Source code 210 includes source code for the application. For example, source code 210 includes the source code files "Makefile", "myapp.png", and "myapp.c", which may include source code for functions and data of the application.

Repository privilege data 126 identifies one or more privileges, such as a privilege level, associated with repository 120. In certain embodiments, repository privilege data is only included in repositories that have a particular privilege level. For example, all of workflows 122 may be executed at a privilege level specified in repository privilege data 126 regardless of the privileges associated with a user that executes the workflows. Furthermore, modification of workflows 122 may be limited to users that have a privilege level specified in repository privilege data 126.

Figure 3:
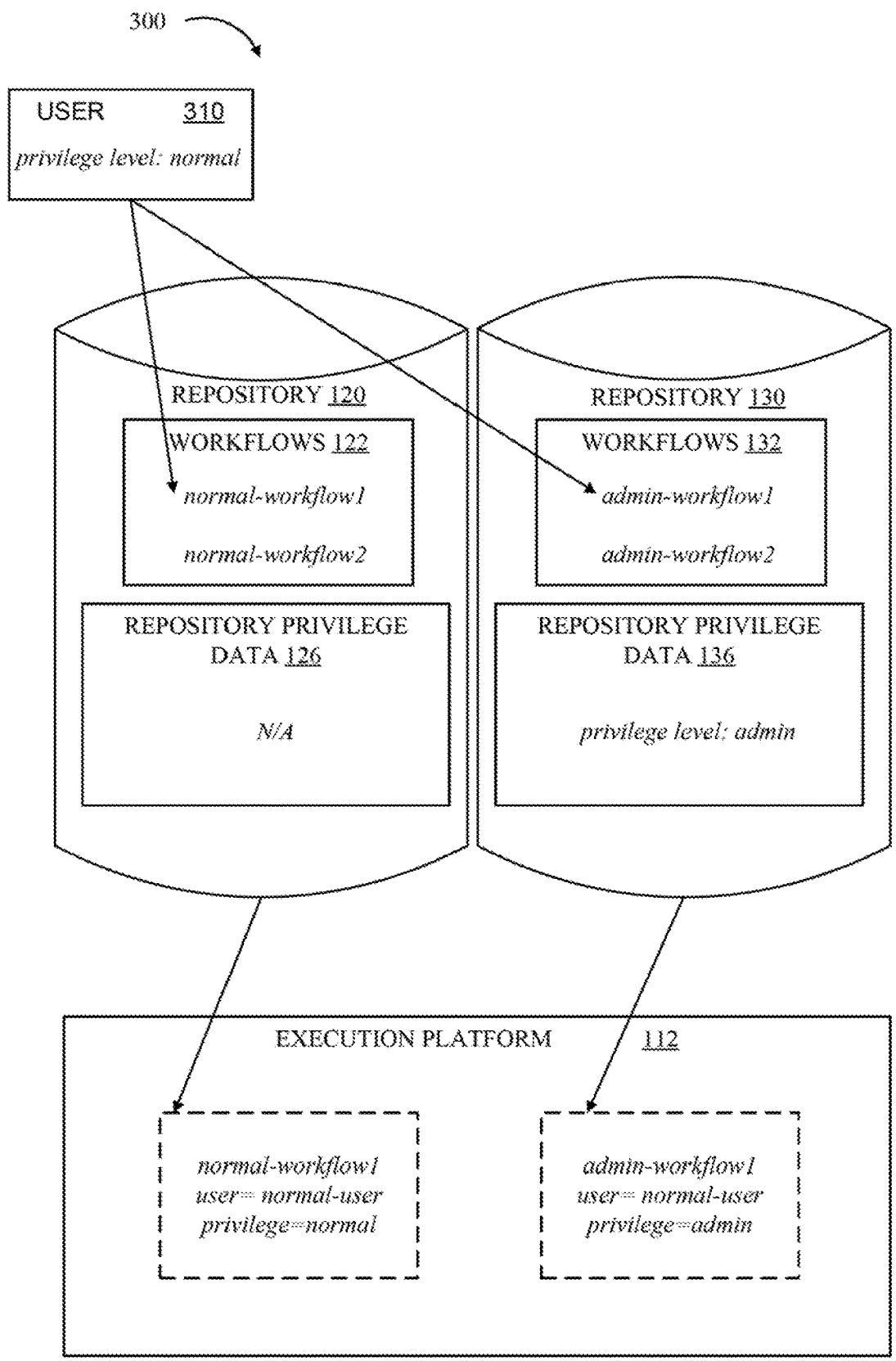
FIG. 3 depicts an example of improved control of workflow execution as described herein.

FIG. 3 depicts an example 300 of improved control of workflow execution as described herein. FIG. 3 includes repositories 120 and 130 and execution platform 112, which are shown and described with respect to FIG. 1.

In example 300, a user 310 has a privilege level of "normal". User 310 initiates normal-workflow1 in workflows 122 of repository 120. Execution platform 112 executes normal-workflow1 and determines that repository 120 does not have repository privilege data (e.g., shown as "N/A" in repository privilege data 126). Accordingly, execution platform 112 executes normal-workflow1 at the privilege level of user 310, which is "normal".

User 310 also executes admin-workflow1 in workflows 132 of repository 130. For example, admin-workflow1 may be executed as part of normal-workflow1 or may be initiated separately by user 310. Execution platform 112 executes admin-workflow1 and determines that repository privilege data 136 indicates that repository 130 has a privilege level of "admin". Accordingly, execution platform 112 escalates the privilege level of user 310 to the privilege level of repository 130, which is "admin", in order to execute admin-workflow1. Privilege escalation may be performed, for example, by temporarily setting the privilege level of user 310 to "admin", executing admin-workflow1 with an effective user that has a privilege level of "admin", temporarily allowing access by the user to a security credential such as a key and/or password, or the like. While any user may be permitted to run workflows 132 in repository 130 through privilege escalation, adding and modifying workflows 132 is limited to users with the privilege level of "admin" defined in repository privilege data 136. As such, non-admin users are only permitted to execute admin-level operations through privilege escalation as explicitly allowed by admin users that define workflows 132 (e.g., via the operations that are included in admin-worflow1 and admin-workflow2 by admin users).

After admin-workflow1 is executed, execution platform 112 may de-escalate the privilege level of user 310 to "normal".

Figure 4:
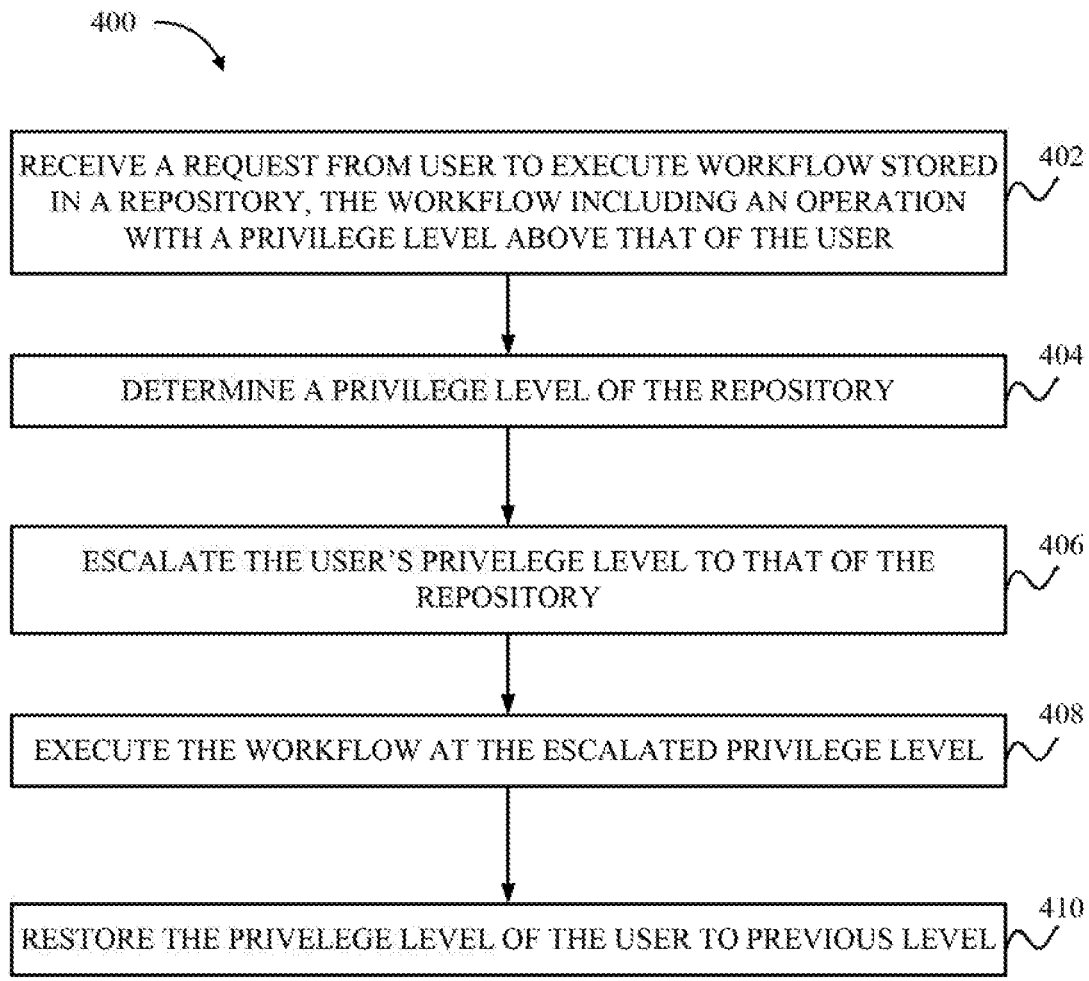
FIG. 4 depicts example operations for improved control of workflow execution.

FIG. 4 depicts example operations 400 for improved control of workflow execution. For example, operations 400 may be performed by execution engine 112 of FIG. 1.

At step 402, a request is received from a user to execute a workflow stored in a repository, the workflow including an operation with a privilege level above that of the user. For example, the user may have a privilege level of "normal" and the operation may require a privilege level of "admin".

At step 404, a privilege level of the repository is determined. For example it may be determined that the repository has a privilege level of "admin".

At step 406, the user's privilege level is escalated to that of the repository. For example, the user's privilege level may be temporarily set to "admin".

At step 408, the workflow is executed at the escalated privilege level. For example, each operation defined in the workflow may be executed by the execution engine at the escalated privilege level.

At step 410, the user's privilege level is restored to its previous level. For example, the user's privilege level may be de-escalated from "admin" back to "normal".

Additional workflows may be executed at the user's original privilege level following operations 400. For example, a workflow stored in a different repository that does not have privilege data may be executed at the user's privilege level.

Figure 5:
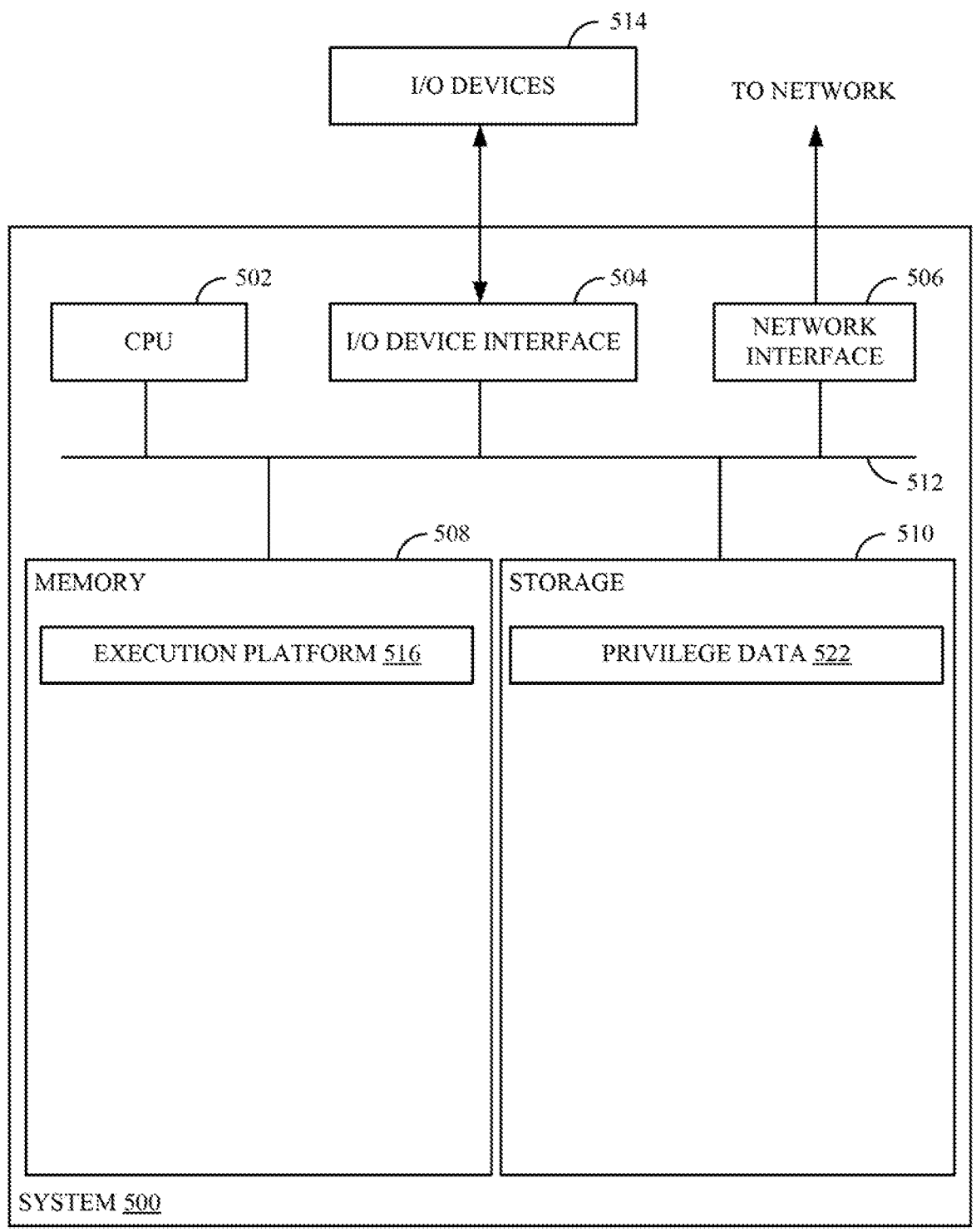
FIG. 5 depicts an example computer system with which embodiments of the present disclosure may be implemented.

FIG. 5 illustrates an example system 500 used for improved control of workflow execution. For example, system 500 may be representative of computing device 110 in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises privilege data 522, which may comprise information related to privileges of users and/or repositories with respect to workflows and/or operations. For example, privilege data 522 may comprise privilege levels associated with users and/or repositories, lists of operations and/or workflows that users and/or repositories are permitted to access and/or modify, lists of users and/or repositories that are permitted to access and/or modify operations and/or workflows, security credentials such as keys or passwords, and the like. In certain embodiments, privilege data 522 may be used in addition to or instead of repository privilege data 126 and 136 of FIG. 1 in order to control execution of workflows.

As shown, memory 508 includes an execution platform 516, which may perform operations related to improved control of workflow execution (e.g., functionality described above with respect to FIGS. 1-4). In some embodiments, execution platform 516 executes workflows on behalf of users. Execution platform may determine, enforce, and escalate privileges as described herein based on privilege data associated with users and/or repositories. For example, execution platform 516 may access privilege data 522 to determine privileges associated with users and/or repositories with respect to executing workflows and/or operations within workflows. In other embodiments, execution platform may access privilege data stored remotely (e.g., in separate repositories and/or user accounts).

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for improved control of workflow execution, comprising:
   during execution of a first workflow for a user by an execution engine, receiving a request to execute a second workflow that is stored in a repository, wherein the second workflow comprises an operation that is associated with an operation privilege level, and wherein a user privilege level of the user is a lower privilege level than the operation privilege level;

determining a repository privilege level associated with the repository by accessing repository privilege data in a file stored on the repository, wherein the repository privilege level comprises a privilege level applied to execution of workflows stored in the repository;

escalating the user privilege level to the repository privilege level such that the user is allowed to execute the second workflow at the repository privilege level and is blocked from adding or modifying workflows in the repository;

executing the second workflow, based on the request, at the repository privilege level for a duration over which the second workflow executes;

restoring the user privilege level to the lower privilege level; and resuming execution of the first workflow at the lower privilege level.

2. The method of claim 1, wherein escalating, based on the repository privilege level, the user privilege level to the repository privilege level comprises temporarily substituting an effective user for the user, wherein the effective user is associated with the repository privilege level, and wherein the second workflow is executed on behalf of the effective user.

3. The method of claim 1, wherein modification of the second workflow in the repository is only permitted to users that have a privilege level equal to that of the repository privilege level.

4. The method of claim 1, wherein the lower privilege level comprises a set of allowed operations that does not include the operation, and wherein the repository privilege level comprises a set of allowed operations that includes the operation.

5. The method of claim 1, wherein escalating, based on the repository privilege level, the user privilege level to the repository privilege level comprises temporarily allowing access, by the user, to a security credential associated with the repository, thereby allowing the user to access the repository using the security credential.

6. The method of claim 1, wherein the repository privilege data comprises a YAML Ain't Markup Language (YAML) object.

7. The method of claim 1, wherein the operation comprises accessing a file system that is generally only accessible by users with a privilege level equal to the repository privilege level.

8. A non-transitory computer-readable medium comprising instructions that, when executed by one or more processors, cause the one or more processors to perform a method for improved control of workflow execution, the method comprising:

during execution of a first workflow for a user by an execution engine, receiving a request to execute a second workflow that is stored in a repository, wherein the second workflow comprises an operation that is associated with an operation privilege level, and wherein a user privilege level of the user is a lower privilege level than the operation privilege level;

determining a repository privilege level associated with the repository by accessing repository privilege data in a file stored on the repository, wherein the repository privilege level comprises a privilege level applied to execution of workflows stored in the repository;

escalating the user privilege level to the repository privilege level such that the user is allowed to execute the second workflow at the repository privilege level and is blocked from adding or modifying workflows in the repository;

executing the second workflow, based on the request, at the repository privilege level for a duration over which the second workflow executes;

restoring the user privilege level to the lower privilege level; and resuming execution of the first workflow at the lower privilege level.

9. The non-transitory computer-readable medium of claim 8, wherein escalating, based on the repository privilege level, the user privilege level to the repository privilege level comprises temporarily substituting an effective user for the user, wherein the effective user is associated with the repository privilege level, and wherein the second workflow is executed on behalf of the effective user.

10. The non-transitory computer-readable medium of claim 8, wherein modification of the second workflow in the repository is only permitted to users that have a privilege level equal to that of the repository privilege level.

11. The non-transitory computer-readable medium of claim 8, wherein the lower privilege level comprises a set of allowed operations that does not include the operation, and wherein the repository privilege level comprises a set of allowed operations that includes the operation.

12. The non-transitory computer-readable medium of claim 8, wherein escalating, based on the repository privilege level, the user privilege level to the repository privilege level comprises temporarily allowing access, by the user, to a security credential associated with the repository temporarily allowing access, by the user, to a security credential associated with the repository, thereby allowing the user to access the repository using the security credential.

13. The non-transitory computer-readable medium of claim 8, wherein the repository privilege data comprises a YAML Ain't Markup Language (YAML) object.

14. The non-transitory computer-readable medium of claim 8, wherein the operation comprises accessing a file system that is generally only accessible by users with a privilege level equal to the repository privilege level.

15. A system comprising one or more processors and a non-transitory computer-readable medium comprising instructions that, when executed by the one or more processors, cause the one or more processors to perform a method for improved control of workflow execution, the method comprising:

during execution of a first workflow for a user by an execution engine, receiving a request to execute a second workflow that is stored in a repository, wherein the second workflow comprises an operation that is associated with an operation privilege level, and wherein a user privilege level of the user is a lower privilege level than the operation privilege level;

determining a repository privilege level associated with the repository by accessing repository privilege data in a file stored on the repository, wherein the repository privilege level comprises a privilege level applied to execution of workflows stored in the repository;

escalating the user privilege level to the repository privilege level such that the user is allowed to execute the second workflow at the repository privilege level and is blocked from adding or modifying workflows in the repository;

executing the second workflow, based on the request, at the repository privilege level for a duration over which the second workflow executes;

restoring the user privilege level to the lower privilege level; and resuming execution of the first workflow at the lower privilege level.

16. The system of claim 15, wherein escalating, based on the repository privilege level, the user privilege level to the repository privilege level comprises temporarily substituting an effective user for the user, wherein the effective user is associated with the repository privilege level, and wherein the second workflow is executed on behalf of the effective user.

17. The system of claim 15, wherein modification of the second workflow in the repository is only permitted to users that have a privilege level equal to that of the repository privilege level.

18. The system of claim 15, wherein the lower privilege level comprises a set of allowed operations that does not include the operation, and wherein the repository privilege level comprises a set of allowed operations that includes the operation.

19. The system of claim 15, wherein escalating, based on the repository privilege level, the user privilege level to the repository privilege level comprises temporarily allowing access, by the user, to a security credential associated with the repository, thereby allowing the user to access the repository using the security credential.

20. The system of claim 15, wherein the repository privilege data comprises a YAML Ain't Markup Language (YAML) object.

21. The system of claim 15, wherein the operation comprises accessing a file system that is generally only accessible by users with a privilege level equal to the repository privilege level.

* * * * *